United States Patent [19]

Sudo

[11] Patent Number: 5,058,975
[45] Date of Patent: Oct. 22, 1991

[54] FIBER OPTIC MIXING DEVICE

[75] Inventor: Haruo Sudo, Tokyo, Japan

[73] Assignee: Asahi Kogaku Kogyo K.K., Tokyo, Japan

[21] Appl. No.: 431,063

[22] Filed: Nov. 3, 1989

[30] Foreign Application Priority Data

May 16, 1989 [JP] Japan .................. 1-121793

[51] Int. Cl.$^5$ .............................................. G02B 6/28
[52] U.S. Cl. .................................... 385/24; 385/27; 385/122
[58] Field of Search ............... 350/96.15, 96.16, 96.29, 350/96.34

[56] References Cited

U.S. PATENT DOCUMENTS 4,371,897  2/1983  Kramer ............................. 358/294
4,546,476  10/1985  Shaw et al. ................... 350/96.15 X
4,941,730  7/1990  Takase et al. ..................... 350/96.34

Primary Examiner—John D. Lee
Assistant Examiner—John Ngo
Attorney, Agent, or Firm—Sughrue, Mion, Zinn Macpeak & Seas

[57] ABSTRACT

A plurality of optical fibers each introducing an optical signal are connected to a side surface of a fluorescent optical fiber. In response to a light beam provided from the optical fiber, fluorescent light is generated in the fluorescent optical fiber. The fluorescent light is transmitted through the fluorescent optical fiber and detected by a photodetector disposed on at least one end face of the fluorescent optical fiber. An output electric signal from the photodetector represents a mixing result of the optical signals introduced by the plurality of optical fibers.

6 Claims, 2 Drawing Sheets

INCIDENT LIGHT

FIBER OPTIC MIXING DEVICE

BACKGROUND OF THE INVENTION

The present invention relates to a fiber optic mixing device for mixing optical signals inputted from a plurality of optical fibers.

FIG. 1 shows the construction of an example of a conventional optical mixing device. In this figure, reference numerals 11 to 15 designate multicore optical fibers of a type used in communications, ends of which are connected to an optical glass 2 at respective prescribed positions. Reference numeral 3 denotes an output single optical fiber connected to the optical glass 2.

An optical signal carried by a laser beam is imputted to each of the optical fibers 11 to 15. The laser beams emitted from the respective optical fibers 11 to 15 are made incident on the optical glass 2 and are mixed therein. The resultant mixed laser beam is outputted so as to enter the single optical fiber 3.

FIG. 2 shows the construction of another example of a conventional fiber optic mixing device. In this figure, reference numeral 31 denotes an optical fiber of an input trunk line, and reference numeral 32 denotes an optical fiber of an output trunk line. Reference numerals 41 to 43 represent half mirrors.

Laser beams emitted from optical fibers 11 to 13 are reflected by the corresponding half mirrors 41 to 43 and are mixed with an input laser beam from the optical fiber 31 and then outputted to the optical fiber 32.

However, the first conventional fiber optic mixing device mentioned above is costly because of the use of the expensive optical glass. Further, since the connecting positions on the optical glass to receive the input optical fibers are limited, the device unavoidably becomes large when a large number of optical fibers are connected to the optical glass.

On the other hand, in the second conventional fiber optic mixing device, the use of the half mirrors incurs such problems that when many optical fibers are connected to the optical glass the device becomes large, complicated and so costly.

SUMMARY OF THE INVENTION

An object of the present invention is to provide a fiber optic mixing device which has a simplified construction and is compact and less expensive.

A fiber optic mixing device according to the present invention comprises: a plurality of optical fibers connected to a side surface of a fluorescent optical fiber, for introducing respective optical signals; the fluorescent optical fiber for generating fluorescent light in response to a light beam provided from the optical fiber; and a photodetector disposed on at least one end face of the fluorescent optical fiber, for detecting the fluorescent light transmitted through the fluorescent optical fiber.

Light beams emitted from the plurality of optical fibers are incident on the side surface of the fluorescent optical fiber. Fluorescent substances are dispersively provided in the fluorescent optical fiber and absorb the incident light beam to generate fluorescent light. This fluorescent light is transmitted within the fluorescent optical fiber to be received by the photodetector disposed on the end face of the fluorescent optical fiber, and therein converted into an output electric signal. Thus, the mixing of the plurality of optical signals are performed.

DESCRIPTION OF THE PREFERRED EMBODIMENTS

Figure 1:
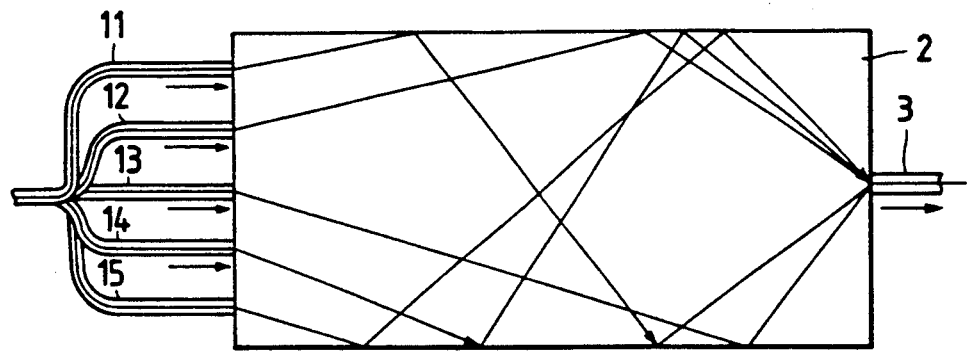
FIG. 1 is a schematic diagram of a conventional fiber optic mixing device.
Figure 2:
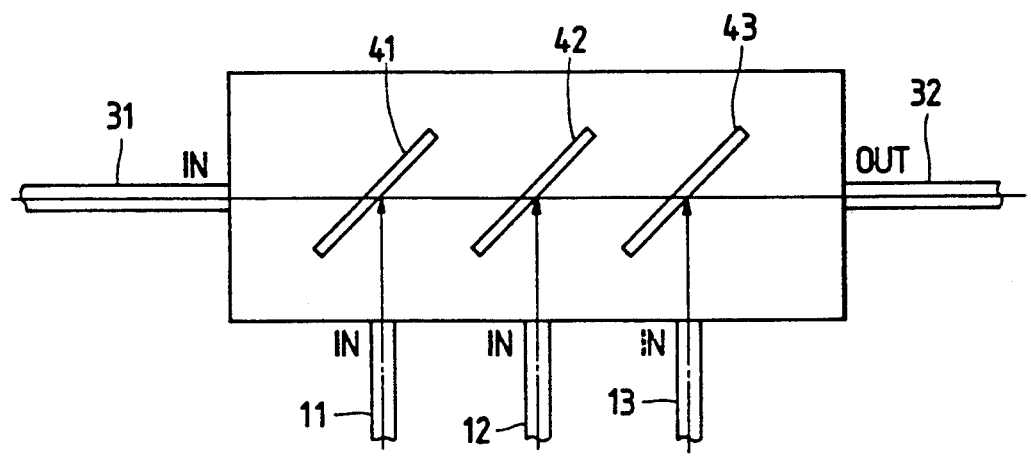
FIG. 2 is a schematic diagram of another conventional fiber optic mixing device.
Figure 3:
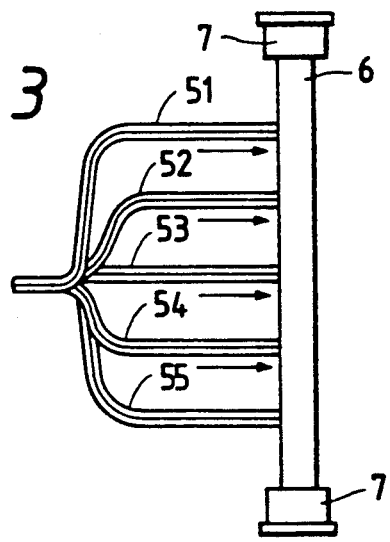
FIG. 3 shows an optical signal mixing device according to a first embodiment of the present invention.

FIG. 3 shows the construction of a fiber optic mixing device of the present invention. In this figure, reference numerals 51 to 55 denote multicore optical fibers of a type used in communications, ends of which are connected to a side surface of a fluorescent optical fiber 6. A photodetector 7 is disposed on at least one end face (both end faces in this embodiment) of the fluorescent optical fiber 6.

Figure 4:
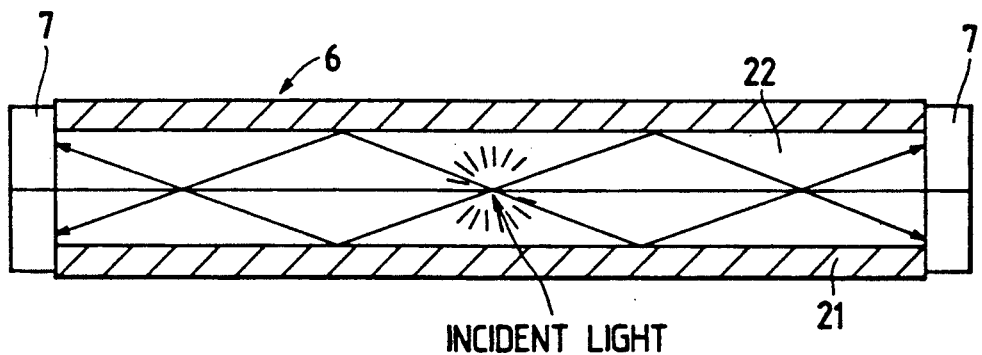
FIG. 4 is a longitudinal cross-sectional view of a fluorescent optical fiber.
Figure 5:
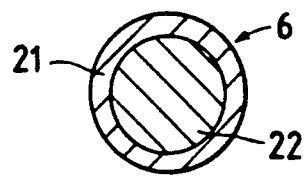
FIG. 5 is a transverse cross-sectional view of the fluorescent optical fiber.

The fluorescent optical fiber 6 is constructed as shown in FIGS. 4 and 5. In these figures, a member 21 is composed of glass, resin, etc. and is generally cylindrical in shape. A member 22 is also composed of glass, resin, etc. and is formed inside the member 21. The refractive index of the member 22 is set to be greater than that of the member 21. Fluorescent substances for absorbing an incident light beam are uniformly dispersed in the member 22.

The light beams such as laser beams incident on the side surface of the fluorescent optical fiber 6 from the optical fibers 51 to 55 pass through the member 21 to be incident on the member 22. Since the member 22 includes the fluorescent substances, this incident light is absorbed by the fluorescent substance, generating fluorescent light.

Since the refractive index of the member 22 is greater than that of the member 21, the fluorescent light generated in the member 22 is reflected by the inside surface of the member 21 and therefore cannot pass through the member 21. Thus, the fluorescent light is transmitted towards the end faces of the member 22 and is detected by the photodetectors 7 disposed on the end faces of the member 22.

Since an amount of the generated fluorescent light corresponds to an amount of the incident light beam, each output of the photodetectors 7 represents a mixing result of optical signals inputted from the optical fibers 51 to 55.

Figure 6:
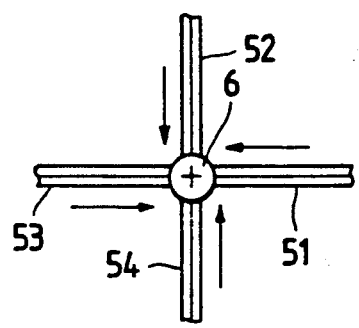
FIG. 6 shows a fiber optic mixing device according to a second embodiment of the present invention.

In the embodiment of FIG. 3, the plurality of optical fibers 51 to 55 are connected to the side surface of the fluorescent optical fiber 6 such that the connecting points of the optical fibers 51 to 55 are linearly arranged. However, as shown in FIG. 6, the optical fibers 51 to 55 may be connected to the side surface of the fluorescent optical fiber 6 such that the connecting points are radially arranged with respect to the axis of the fluorescent optical fiber 6.

Figure 7:
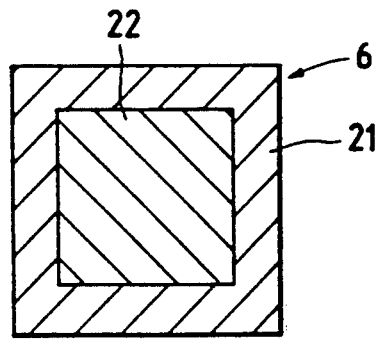
FIG. 7 is a cross-sectional view of another type of a fluorescent optical fiber.

In the above-mentioned embodiment, the fluorescent optical fiber 6 is formed in the cylindrical shape, but it may be formed in a rectangular shape in cross section, that is, in the shape of a rectangular pole, as shown in FIG. 7.

With the fiber optic mixing device of the present invention, the device has a simplified construction and can be made compact and less expensive.

What is claimed is:

1. A fiber optic mixing device for summing a plurality of optical input signals and generating a mixed output signal, comprising:

a fluorescent optical fiber;

a plurality of optical fibers connected to a side surface of said fluorescent optical fiber, wherein said optical input signals, emitted from the respective optical fibers, are made incident on the fluorescent optical fiber in a direction substantially perpendicular to an axis between one end face and the other end face of said fluorescent optical fiber;

wherein said fluorescent optical fiber generates fluorescent light in response to said optical input signals, wherein an amount of said fluorescent light is proportional to an amount of said optical input signals, wherein said fluorescent optical fiber transmits said fluorescent light to said end faces of the fluorescent optical fiber; and a photodetector disposed on at least one of said end faces of said fluorescent optical fiber to detect said fluorescent light transmitted through said fluorescent optical fiber and to output said mixed output signal.

2. An optical signal mixing device as claimed in claim 1, wherein connecting ends of said plurality of optical fibers are arranged in a line along a longitudinal direction of said fluorescent optical fiber.

3. An optical signal mixing device as claimed in claim 1, wherein connecting ends of said plurality of optical fibers are radially arranged about said axis of said fluorescent optical fiber.

4. An optical signal mixing device as claimed in claim 1, wherein said fluorescent optical fiber is cylindrical in shape.

5. An optical signal mixing device as claimed in claim 1, wherein said fluorescent optical fiber has a shape of a rectangular pole.

6. A fiber optic mixing device for summing a plurality of optical input signals and generating a mixed output signal, comprising:

a fluorescent optical fiber;

a plurality of optical fibers connected to a side surface of said fluorescent optical fiber, wherein said optical input signals, emitted from end faces of the respective optical fibers, are made incident on the fluorescent optical fiber;

wherein said fluorescent optical fiber generates fluorescent light in response to said optical input signals, wherein an amount of said fluorescent light is proportional to an amount of said optical input signals, wherein said fluorescent optical fiber transmits said fluorescent light to said end faces of the fluorescent optical fiber; and a photodetector disposed on at least one of said end faces of said fluorescent optical fiber to detect said fluorescent light transmitted through said fluorescent optical fiber and to output said mixed output signal.

* * * * *